United States Patent
Zakharenko et al.

(10) Patent No.: US 11,036,702 B1
(45) Date of Patent: Jun. 15, 2021

(54) GENERATION OF SEARCH INDEXES FOR DISPARATE DEVICE INFORMATION

(71) Applicant: Amazon Technologies, Inc., Seattle, WA (US)

(72) Inventors: Oleksii Zakharenko, Mercer Island, WA (US); Brian Kai-Yan Luong, Seattle, WA (US); Shusha Li, Issaquah, WA (US); Amit J. Mhatre, Seattle, WA (US); Nanda Kishore Enagalur, Redmond, WA (US); Dmytro Gayvoronskyy, Lynnwood, WA (US); William Alexander Stevenson, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 369 days.

(21) Appl. No.: 15/934,194

(22) Filed: Mar. 23, 2018

(51) Int. Cl.
 *G06F 16/22* (2019.01)
 *G06F 16/245* (2019.01)
 *G06F 16/9537* (2019.01)

(52) U.S. Cl.
 CPC ............ *G06F 16/22* (2019.01); *G06F 16/245* (2019.01); *G06F 16/9537* (2019.01)

(58) Field of Classification Search
 CPC .................................................... G06F 16/213
 USPC ......................................................... 707/711
 See application file for complete search history.

(56) References Cited

U.S. PATENT DOCUMENTS

| | | | |
|---|---|---|---|
| 8,312,451 B2* | 11/2012 | Poole | H04L 67/34 717/168 |
| 2009/0282403 A1* | 11/2009 | Poole | G06F 8/61 717/178 |
| 2018/0078858 A1* | 3/2018 | Chai | A63F 13/655 |
| 2018/0373747 A1* | 12/2018 | Peng | G06F 16/2291 |

* cited by examiner

*Primary Examiner* — Baoquoc N To
(74) *Attorney, Agent, or Firm* — Davis Wright Tremaine LLP

(57) ABSTRACT

Technology is described for generating a search index. Device information associated with a customer may be identified. A device attribute included in the device information may be identified. The device attribute may include an attribute name and an attribute value. Key-value pairs may be formed for device attribute included in the device information. The key-value pairs may include a first key-value pair for the attribute name and a second key-value pair for the attribute value. The search index may be generated to include the key-value pairs for the device attribute included in the device information.

20 Claims, 9 Drawing Sheets

```
{
    "account": "AccountId",
    "customerIndex": "CustomerIndexId",
    "CustomerIndexId": {
        "thingName": "ThingName",
        "thingId": "ThingId",
        "registry": {
            "thingType": "ThingType",
            "thingGroupNames": [ "Group1", "Group2", ...],
            "attributes": [ {
                "attributeName": "Name1",
                "stringValue": "Value1",
            }, {
                "attributeName": "Name2",
                "stringValue": "Value2AsString",
                "numericValue": Value2AsNumber
            }, ... ],
            /* For exists queries */
            "allAttributeNames": [ "Name1", "Name2", ...],
            /* For searching without a field name */
            "allValues": ["Value1", "Value2AsString", ...]
            "version": RegistryDDBRecordVersion
        }
        "shadow": {
        "desired": {...},
        "reported": {...},
        "delta": {...},
        "metadata": {...},
        "version": ShadowDDBRecordVersion
        }
    }
}
```

First Key 510 → "attributeName": "Name1", First Value 512
Second Key 520 → "stringValue": "Value1", Second Value 522

FIG. 5

GENERATION OF SEARCH INDEXES FOR DISPARATE DEVICE INFORMATION

BACKGROUND

Electronic devices have become ever-present in many aspects of society. Devices may be found in the workplace, at home, or at school. Advancements in communication technologies have allowed even relatively simple electronic devices to communicate with other devices and computing systems over a computer network. For example, the Internet of Things (IoT) is the interconnection of computing devices across the globe using the existing Internet infrastructure. Such devices may be able to capture data, and then the devices may securely communicate the data over a network to a centralized computing service (e.g., a service provider environment). The devices may be controlled (e.g., device settings may be adjusted) and monitored remotely using a separate computing device.

Electronic devices (e.g., IoT devices or embedded devices) may be included in a variety of physical devices or products, such as industrial equipment, farm machinery, home appliances, manufacturing devices, industrial printers, automobiles, thermostats, smart traffic lights, vehicles, buildings, etc. These physical devices may have embedded electronics, software, sensors, and network connectivity that enables these physical devices to collect and send data. Electronic devices (e.g., IoT devices, etc.) may be useful for a number of applications, such as environmental monitoring, farming, infrastructure management, industrial applications, building and home automation, energy management, medical and healthcare systems, transport systems, etc.

In one example, devices may register with the centralized computing service prior to communicating data to the centralized computing service. The centralized service may provide a registry to manage the devices. For example, the centralized service may store definitions or descriptions of the devices in the registry. In addition, the centralized service may store state information for the devices (e.g., current and previous state information for the devices). The contents of the registry and the state information may be accessible to customers associated with the devices.

BRIEF DESCRIPTION OF THE DRAWINGS

FIG. 5 illustrates a specific document in a search index according to an example of the present technology.

DETAILED DESCRIPTION

Figure 1:
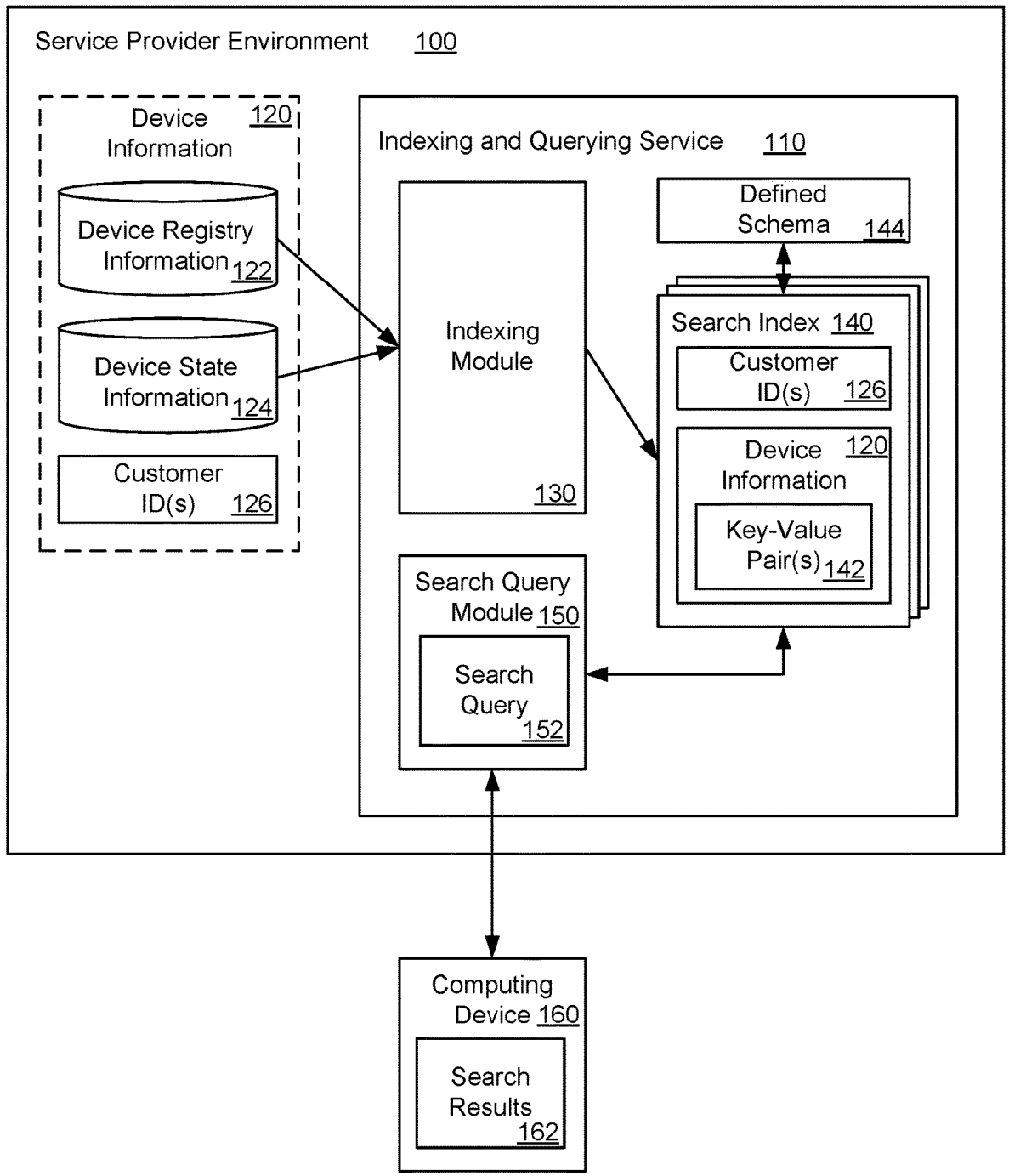
FIG. 1 illustrates a system and related operations for generating a search index that includes key-value pairs for device attributes and for performing search queries against the search index according to an example of the present technology.

A technology is described for generating a search index using device information. The device information may include device registry information and/or device state information. The search index may be generated to include key-value pairs for device attributes included in the device information. The device attributes may include attribute names (e.g., field names) and corresponding attribute values. The key-value pairs may provide separate key-value pairs for attribute names and attribute values of a device. The key-value pairs in the search index may be in accordance with a defined schema. The search index may be created for multiple customer identifiers (IDs) or an individual customer may have a customer's own search index. After the search index is generated, search queries may be performed against the search index. For example, a search query may include an attribute name or value associated with a selected customer ID, which may be searched against the attribute names and attribute values in the key-value pairs included in the search index. The search index may include the key-value pairs for the device attributes in accordance with the defined schema to provide an effective search solution when searching against device information belonging to multiple customer IDs.

In one configuration, an indexing and querying service operating in a service provider environment may initiate a process for identifying device information associated with one or more customer IDs and generate a search index for the customer IDs using the device information associated with one or more customer IDs. The indexing and querying service may initiate the process for a given customer ID based on a flag enabled in a customer account associated with the customer ID. Based on enabled flags in customer account(s), the indexing and querying service may identify device information associated with a plurality of customer IDs. For example, the indexing and querying service may identify device information associated with a first customer ID, device information associated with a second customer ID, and so on. The device information may include device registry information that includes definitions of devices (e.g., IoT devices) and/or device state information with attribute names and values that describe current states of the devices, where the devices may be associated with the customer ID(s). In addition, the device information may include device connection information, device geolocation information, device behavior data, etc. The device connection information may include an Internet Protocol (IP) address associated with the device, a cipher used to establish a connection for the device, etc. The device geolocation information may include geolocation information for the device. The device behavior data may include behavior information for the device, such as a last time that the device was connected to the service provider environment, an indication of whether the device is currently connected to the service provider environment, etc. The indexing and querying service may identify the device information from data store(s) in the service provider environment that are used for storing the device registry information and/or the device state information.

In one example, the indexing and querying service may form key-value pairs for device attributes included in the device information. In another example, the indexing and querying service may form the key-value pairs from the device attributes, such that the key-value pairs may include a first key that defines an attribute name tag and a first value that defines a corresponding attribute name, and a second key that defines an attribute value tag and a second value that defines a corresponding attribute value. The attribute value that corresponds to the attribute value tag may be a string value and/or a numeric value.

In one example, the indexing and querying service may generate the search index for the customer IDs to include the key-value pairs for the device attributes included in the device information. The indexing and querying service may generate the search index in accordance with a defined schema that enables at least two key-value pairs to represent the device attributes included in the device information. The defined schema may enable the search index to include key-value pairs corresponding to a relatively large number of device attributes across one or multiple customer IDs.

In one configuration, the indexing and querying service may convert the device attributes included in the device information into index entries with a first common key for attribute names and a second common key for attribute values. The indexing and querying service may generate the search index to include the attribute names with the first common key and the attribute values with the second common key. Further, in the search index, the first common key may be associated with many attribute names and the second common key may be associated with many attribute values.

The indexing and querying service may store the search index on a cluster of computing resources in the service provider environment. In one example, the search index may be a collection of documents, where each document may include a search index ID, a customer ID, a device name, a device ID and device information that corresponds to the device ID. The device information may include the key-value pairs for the device attributes. In other words, the search index may include the same device information that was identified from the data store(s) in the service provider environment, but the device information may include device attributes that have been reorganized as the key-value pairs. The reorganization of the device attributes into key value pairs reduces the overall size of the key space used to index the device attributes. In addition, the device information may include a version number associated with the device information.

In one example, the indexing and querying service may receive a search query to be performed against the search index. The search query may be performed for various purposes, such as customer support, reporting, alarming, etc. The search query may be a string search query or a numeric search query. The search query may include an attribute name and/or an attribute value for a selected customer ID (i.e., the search query may filter by customer ID). The search query may also include a selected search index ID (e.g., when the search query is to be performed against a particular search index from a group of search indexes for the selected customer ID). The search query may be performed using a complex query language that allows multiple attribute names, attribute values and/or other query terms to be included in the search query. The indexing and querying service may perform the search query against the key-value pairs included in the search index based on the attribute name and/or the attribute value received for the selected customer ID and the selected search index ID. In other words, the attribute name and/or the attribute value included in the search query may be compared with the attribute names and attribute values included in the key-value pairs. The indexing and querying service may return search results based on the search query. The search results may be presented in a format that is similar to a format in which the device information is stored in the service provider environment (e.g., in a JSON format, an attribute value format, etc.), as opposed to being presented in a key-value pair format (as in the search index). For example, the search results may include a listing of attribute names and/or attribute values from the search index that matches or corresponds to the attribute name and/or the attribute value included in the search query. Alternatively, the search results may indicate that there is no match between the attribute names and/or attribute values in the search index and the attribute name and/or the attribute value included in the search query.

In one example, the indexing and querying service may provide the ability to store and efficiently search device information (e.g., device registry information and/or device state information) that belongs to multiple customers using a single search index. In other words, a single search index may be shared among multiple customers. In some cases, a large customer may be assigned a dedicated search index, but generally, medium-sized or smaller customers may share a single search index to increase efficiency and reduce operating costs.

One challenge with having multiple customers share the same single index is keeping the search index searchable in an efficient manner, as the device information for different customers may include a large number of unique device attributes. For example, one customer may be tracking light bulbs using a first set of device attributes, while another customer may track machinery using a second set of device attributes that is different than the first set. Generally speaking, scaling of the search index may degrade when the number of device attributes grows quickly. In past solutions, the search index would use direct indexing of the key-values in the device attributes or device states, which involved creating key-value pairs between attribute names and attribute values, resulting in a relatively large number of different schemas being used for storing different attribute names and values associated with different customers. For example, in past solutions, one customer may define the attribute name 'light bulb color' to correspond to the value 'color', another customer may define the attribute name 'lb_color' to correspond to the value 'color2', and so on. As a result, in past solutions, storing device attributes for multiple customers in the same search index would create a schema explosion due to the relatively large number of unique device attribute types (or variety of device attribute types) for the multiple customers, thereby causing the search index to run more slowly and be overwhelmed by the number of device attributes and stop accepting new device information after a certain point.

Therefore, in the present technology, the search index may utilize key-value pairs for the sub-portions device attributes (e.g., the attribute names and values). The key-value pairs may enable an increased amount of device information for multiple customer IDs to be indexed and efficiently searched using a single search index. Each of the device attributes included in the device information for the multiple customer IDs may be formatted as key-value pairs in accordance with the defined schema for the search index. Based on the defined schema, key-value pairs for a device attribute may include a first key that defines a attribute name tag and a first value that defines a corresponding attribute name, as well as a second key that defines an attribute value tag and a second value that defines a corresponding attribute value. In accordance with the defined schema, the first key that defines the attribute name tag and the second key that defines the attribute value tag may be defined by the indexing and querying service and may be common between the multiple customer IDs, whereas the attribute value corresponding to the first and second values, respectively, may be string and/or numeric values that are uniquely defined by the customer (depending on the type of device). The defined schema may be useful in reducing the large variation in device attribute formats involved when defining the device attributes of different customers in the search index. As a result, the search index may store key-value pairs for device attributes associated with multiple customer IDs in the same search index, and searches for attribute names and/or attribute values may be efficiently performed against the search index due to the reorganized and/or fixed format of the key-value pairs for the device attributes in the search index.

FIG. 1 illustrates an exemplary system and related operations for generating a search index 140 that includes key-value pairs 142 for device attributes and performing search queries against the search index 140. The search index 140 may be generated and the search queries may be performed using an indexing and querying service 110 in a service provider environment 100. The search index 140 may be stored on a cluster of computing resources in the service provider environment 100 for improved durability.

In one example, an indexing module 130 in the indexing and querying service 110 may initiate a process for identifying device information 120 associated with one or more customer ID(s) 126 and generating the search index 140 for the customer IDs using the device information 120. The indexing module 130 may initiate the process for indexing the device information 120 associated with the customer ID(s) 126 based on a flag enabled in customer account(s) associated with the customer ID(s) 126. Based on enabled flags in the customer account(s), the indexing module 130 may identify the device information 120 associated with the customer ID(s) 126. The device information 120 may include device registry information 122 that includes definitions of devices (e.g., IoT devices) and/or device state information 124 that describes current states of the devices. In addition, the devices may be associated with the customer ID(s) 126. The indexing module 130 may identify the device information 120 from data store(s) in the service provider environment 100 that is used for storing the device registry information 122 and/or the device state information 124, respectively.

In one example, the device information 120 may be provided to the indexing module 130, and the indexing module 130 may generate the search index 140 for the customer ID(s) associated with the device information 120. The indexing module 130 may generate the search index 140 to include key-value pairs 142 for device attributes included in the device information 120. The indexing module 130 may form the key-value pairs 142 from the device attributes, such that the key-value pairs 142 may include a first key that defines an attribute name tag and a first value that defines a corresponding attribute name, and second key that defines an attribute value tag and a second value that defines a corresponding attribute value. The attribute value that corresponds to the attribute value tag may be a string value and/or a numeric value. For example, when the string value is able to be parsed as a number, the numeric value may be created as an alternative to the string value. Alternatively, the attribute value may include other types of attribute values, such as global positioning system (GPS) values or GPS coordinates, timestamp values, specialized values, etc. The device attributes in the device information 120 may not initially be in a key-value format, and the indexing module 130 may reorganize the device attributes in the device information 120 as key-value pairs 142 for inclusion in the search index 140. In other words, the search index 140 may include the device information 120 (e.g., device registry information 122 and/or the device state information 124) that is initially provided to the indexing module 130, but the device information 120 may include device attributes that have been reorganized as the key-value pairs 142.

In one example, the device attributes included in the device information 120 may be device registry attributes and/or device state attributes. Examples of device registry attributes may include model or wattage when a device is a light bulb. Examples of device state attributes may include a desired device state, a reported device state (e.g., on/off, temperature, moisture, location), metadata, etc., irrespective of device type.

In one example, the indexing module 130 may generate the search index 140 in accordance with a defined schema 144 that enables the key-value pairs 142 to be associated with the device attributes included in the device information 120. In other words, the indexing module 130 may format the device attributes in the device information 120 to be key-value pairs 142 based on the defined schema 144. The defined schema 144 may enable the search index 140 to include key value pairs 142 corresponding to a relatively large number of device attributes for multiple customer IDs 126, and the search index 140 may provide improved search results when the device attributes are in the key-value pair format in accordance with the defined schema 144.

In one example, the search index 140 may be a collection of documents, where each document may include a search index ID, a particular customer ID 126, a device name, a device ID, and device information 120 (e.g., device registry information 122 and/or the device state information 124) that corresponds to the device ID. The device information 120 in the search index 140 may include key-value pairs 142 for device attributes included in the device information 120. In addition, the search index 140 may include a version number associated with the device information 120 included in the search index 140.

In one configuration, a search query module 150 in the indexing and querying service 110 may receive a search query 152 from a computing device 160 to be performed against the search index 140. The search query 152 may be a string search query or a numeric search query. Alternatively, the search query 152 may include other types of search queries, such as global positioning system (GPS) fields or GPS coordinates, specialized state fields, time stamp fields, etc. The search query 152 may include an attribute name or an attribute value for a selected customer ID 126 (i.e., the search query 152 may filter by customer ID 126). The search query module 150 may perform the search query 152 against the key-value pairs 142 included in the search index 140 based on the attribute name and/or the attribute value received for the selected customer ID 126. In other words, the attribute name and/or the attribute value included in the search query 152 may be compared with the attribute names and attribute values included in the key-value pairs 142 of the search index 140. The search query module 150 may return search results 162 to the computing device 160 based on the search query 152. For example, the search results 162 may include a listing of attribute names and/or attribute values from the search index 140 that match or correspond to the attribute name and/or the attribute value included in the search query 152. Alternatively, the search results 162 may indicate that there is no match between the attribute names and/or attribute values in the search index 140 and the attribute name and/or the attribute value included in the search query 152.

In one configuration, the indexing module 130 may update the search index 140 to include updated device information. In other words, in some cases, the indexing module 130 may replace the device information 120 in the search index 140 with updated device information (e.g., updated key-value pairs). For example, the indexing module 130 may identify updated device information associated with the customer ID(s) 126. The updated device information may include updated key-value pairs that reflect updated device attributes associated with the customer ID(s) 126. The indexing module 130 may determine that a version number of the updated device information is greater than a version number associated with the device information 120 that is currently included in the search index 140. In this case, the indexing module 130 may replace the device information 120 in the search index 140 with updated device information (e.g., updated key-value pairs).

In one configuration, the indexing module 130 may generate the search index 140 for the customer ID(s) 126 to replace a previously generated search index for the customer ID(s) 126. Customer search queries (e.g., the search query 152 received from the computing device 160) may be served by the previously generated search index during generation of the search index 140. After generation of the search index 140 is completed, the indexing module 130 may delete the previously generated search index, and subsequent customer queries may be served by the search index 140 and not by the previously generated search index.

In one configuration, the indexing module 130 may receive a search index request to add device information 120 for an additional customer ID 126. The indexing module 130 may determine that the search index request may be fulfilled using the search index 140 that is already generated in the service provider environment 100. In other words, the indexing module 130 may determine that the search index 140 has capacity to accept additional device information 120. The indexing module 130 may identify the additional device information 120 associated with the additional customer ID 126 for the additional customer ID 126. The indexing module 130 may form additional key-value pairs 142 for the additional device information 120 associated with the additional customer ID 126. The indexing module 130 may add the additional device information 120 (which includes the additional key-value pairs 142) to the search index 140.

In one example, the indexing module 130 may utilize separate schemas when generating search indexes based on a type of search index that is generated. For example, when the indexing module 130 is generating a search index 140 to be shared by multiple customer IDs 126, the indexing module 130 may utilize a first type of schema. On the other hand, when the indexing module 130 is generating a search index 140 for a single customer ID 126, the indexing module 130 may utilize a second type of schema. In addition, the indexing module 130 may be able to update the defined schema 144 to add new fields or remove existing fields as desired. For example, the indexing module 130 may update the defined schema 144 to add new fields for types of attribute values other than string values and numeric values.

In one configuration, the indexing module 130 may generate multiple search indexes for a given customer ID 126. A search index 140 in the multiple search indexes may correspond to device information 120 (which includes the key-value pairs 142) for the given customer ID 126. The search index 140 in the multiple search indexes may be stored on a particular cluster of computing resources that have processing capabilities (e.g., a computing instance or server). The multiple search indexes may be used to perform search queries for the given customer ID 126. In one example, when a certain search index is handling an increased load with respect to other search indexes for the given customer ID 126, the indexing module 130 may perform load balancing for migration of certain device information 120 for the given customer ID 126 between the search indexes on separate clusters of computing resources before, during and/or after the occurrence of the increased load. In addition, the indexing module 130 may generate the multiple search indexes on multiple clusters of computing resources, and device information 120 included in the search indexes may be migrated between the separate clusters of computing resources for load balancing and disaster recovery.

Figure 2:
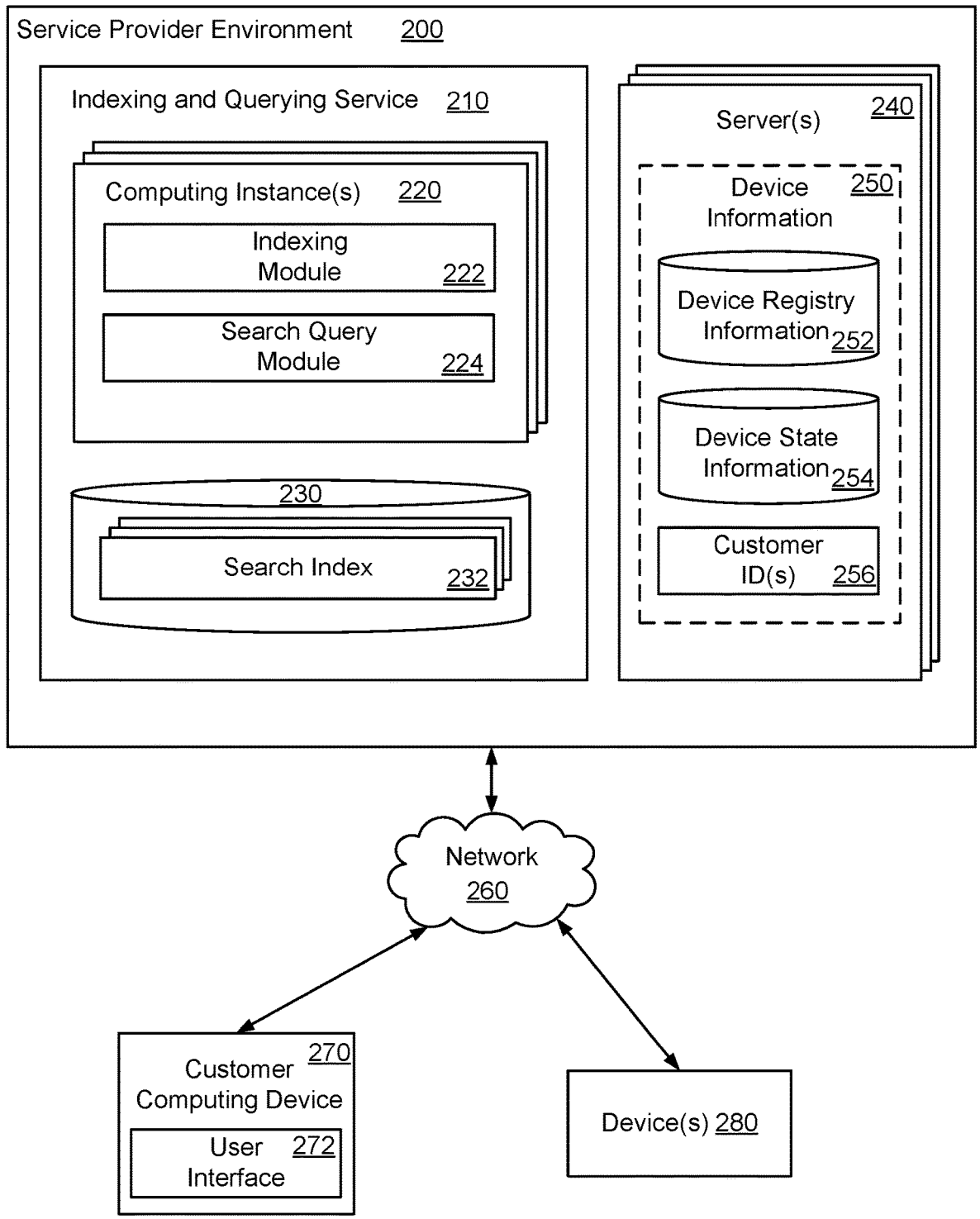
FIG. 2 is an illustration of a networked system for generating a search index that includes key-value pairs for device attributes and for performing search queries against the search index according to an example of the present technology.

FIG. 2 illustrates example components of the present technology in a service provider environment 200. The service provider environment 200 may operate an indexing and querying service 210. The indexing and querying service 210 may utilize one or more computing instances 220 for generating a search index 232 using device information 250 stored on one or more servers 240 in the service provider environment 200. The device information 250 may include device registry information 252 associated with customer IDs 256, as well as device state information 254 associated with customer IDs 256. The device information 250 may be associated with a plurality of devices 280 (e.g., IoT devices, embedded devices or other devices). The devices 280 may be in communication with the service provider environment 200 over a network 260. The indexing and querying service 210 may store the search index 232 in a data store 230 of the service provider environment 200. In one example, the indexing and querying service 210 may receive a search query from a customer computing device 270 over the network 260. The indexing and querying service 210 may perform the search query against the search index 232 and return search results to the customer computing device 270. The search query may be received and the search results may be displayed via a user interface 272 at the customer computing device 270.

In one example, the data store 230 may include the search index 232. The search index 232 may be a collection documents, where each document may include a search index ID, a particular customer ID 256, a device name, a device ID, and device information 250 (e.g., device registry information 252 and/or the device state information 254) that corresponds to the device ID. The device information 250 in the search index 232 may include key-value pairs for device attributes included in the device information 250. In addition, the search index 232 may include a version number associated with the device information 250 included in the search index 232.

The computing instance(s) 220 operated by the indexing and querying service 210 may utilize a number of modules for generating the search index 232 and performing search queries against the search index 232. The computing instance(s) 220 may include an indexing module 222, a search query module 224, and other applications, services, processes, systems, engines, or functionality not discussed in detail herein.

The indexing module 222 may identify device information 250 associated with customer IDs 256. The device information 250 may include device registry information 252 that includes a definition of a device 280 and/or device state information 254 that describes a current state of the device 280. The indexing module 222 may form key-value pairs for device attributes included in the device information 250, where the key-value pairs may include a first key that defines an attribute name tag and a first value that defines a corresponding attribute name, and a second key that defines an attribute value tag and a second value that defines a corresponding attribute value. The indexing module 222 may generate the search index 232 for the customer IDs 256 to include the key-value pairs for the device attributes included in the device information 250.

The search query module 224 may receive a search query to be performed against the search index 232. The search query module 224 may receive the search query from the customer computing device 270. The search query includes an attribute name and/or an attribute value for a selected customer ID 256. The search query module 224 may perform the search query against the key-value pairs included in the search index 232 based on the attribute name and/or the attribute value received for the selected customer ID 256. For example, the search query module 224 may compare the attribute name and/or the attribute value included in the search query with the attribute names and attribute values included in the key-value pairs of the search index 232. The search query module 224 may return search results based on the search query to the customer computing device 270.

The customer computing device 270 with the user interface 272 may comprise, for example a processor-based system. The customer computing device 270 may be a device such as, but not limited to, a desktop computer, laptop or notebook computer, tablet computer, a mobile device, mainframe computer system, handheld computer, workstation, network computer, or other devices with like capability.

The devices 280 (e.g., IoT devices) may be, for example, processor-based systems or embedded systems. As non-limiting examples, the devices 280 may include consumer products (e.g., rice cookers, televisions, printers, or scanners), home automation products (e.g., smart thermostats, smart refrigerators, heating, air conditioning, etc.), manufacturing devices, farming devices, factory devices, industrial metal stamping devices, industrial robots, sensors, drones, or other devices that are assigned unique identifiers and are capable of communicating data over the network 260. Commercial devices may also be included in the definition of the device 280, including: commercial printing presses, commercial freezers, commercial kilns, commercial mixers or other commercial equipment. The devices 280 may be other types of embedded devices that provide electronic controls for a machine or system.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 260 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
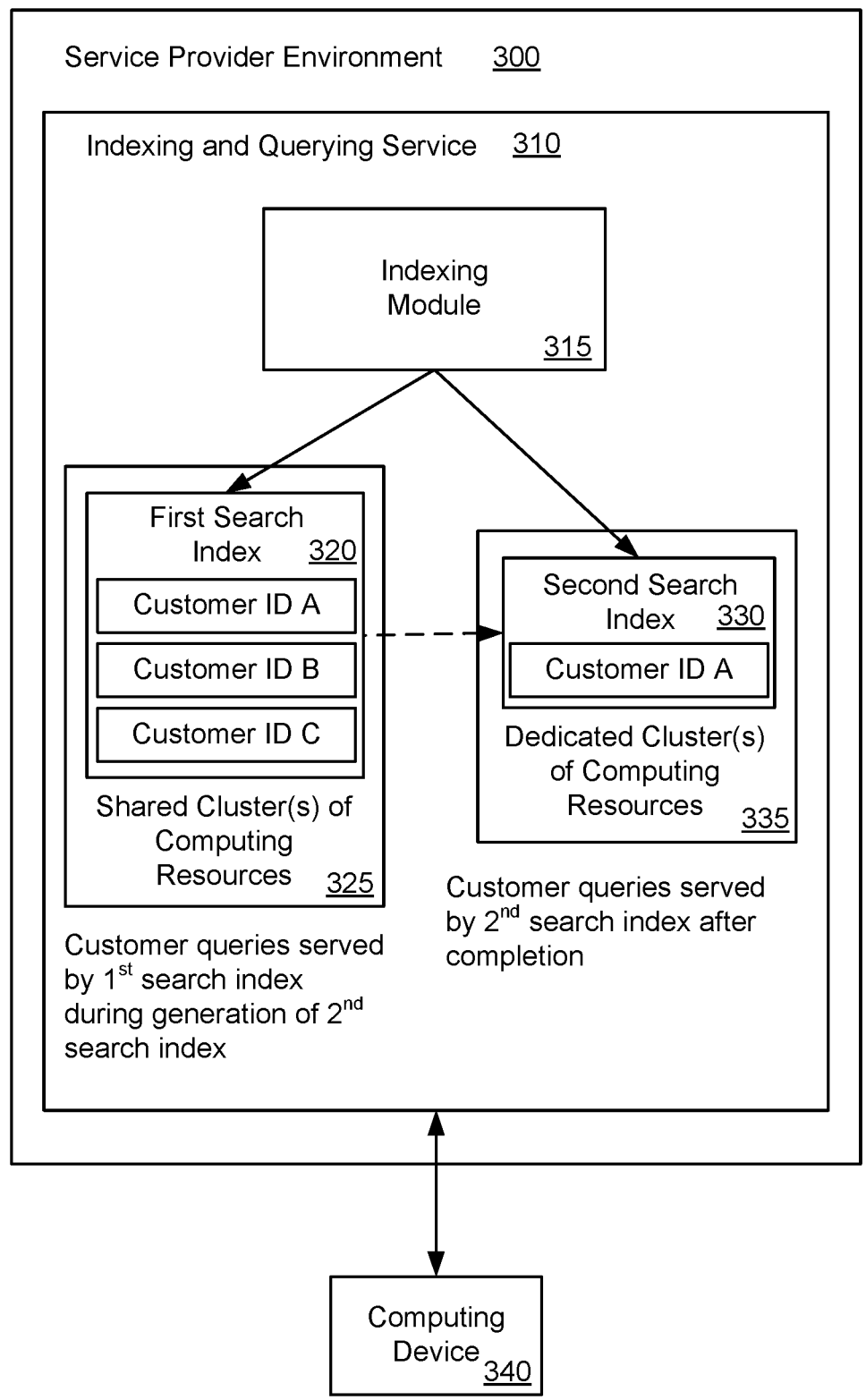
FIG. 3 illustrates a system and related operations for generating a second search index and switching from a first search index to the second search index according to an example of the present technology.

FIG. 3 illustrates an exemplary system and related operations for generating a second search index 330 and switching from a first search index 320 to the second search index 330. For example, the first and second search indexes 320, 330 may be generated using an indexing module 315 in an indexing and querying service 310 that operates in a service provider environment 300. The indexing module 315 may generate the first search index 320 for a group of customer IDs (e.g., customer IDs A, B and C). The indexing module 315 may generate the first search index 320 to be on a shared cluster of computing resources 325 in the service provider environment 100. However, after a certain period of time, an amount of device information included in the first search index 320 for a particular customer ID (e.g., customer ID A) may grow to be beyond a capacity of the first search index 320. In this example, the indexing module 315 may begin creating the second search index 330 for customer ID A to be on a dedicated cluster of computing resources 335 in the service provider environment 100. The second search index 330 may be generated as an alternative search index for customer ID A. In this example, the indexing module 315 may not simply copy customer ID A's search index information from the first search index 320 to the second search index 330. Rather, the indexing module 315 may perform a complete re-indexing for customer ID A from a data store that contains the device information (e.g., device registry information and/or device state information) for customer ID A. During construction of the second search index 330, customer search queries received from a computing device 340 for customer ID A may continue to be served by the first search index 320. After completion of the second search index 330, customer search queries received from the computing device 340 for customer ID A may be served by the second search index 330, while customer search queries for customer IDs B and C may continue to be served by the first search index 320. The second search index 330 may be dedicated to customer ID A due to the relatively large amount of device information to be indexed in the second search index 330 for customer ID A. In addition, customer ID A's search index information may be deleted from the first search index 320 after the second search index 330 is completed for customer ID A.

Figure 4:
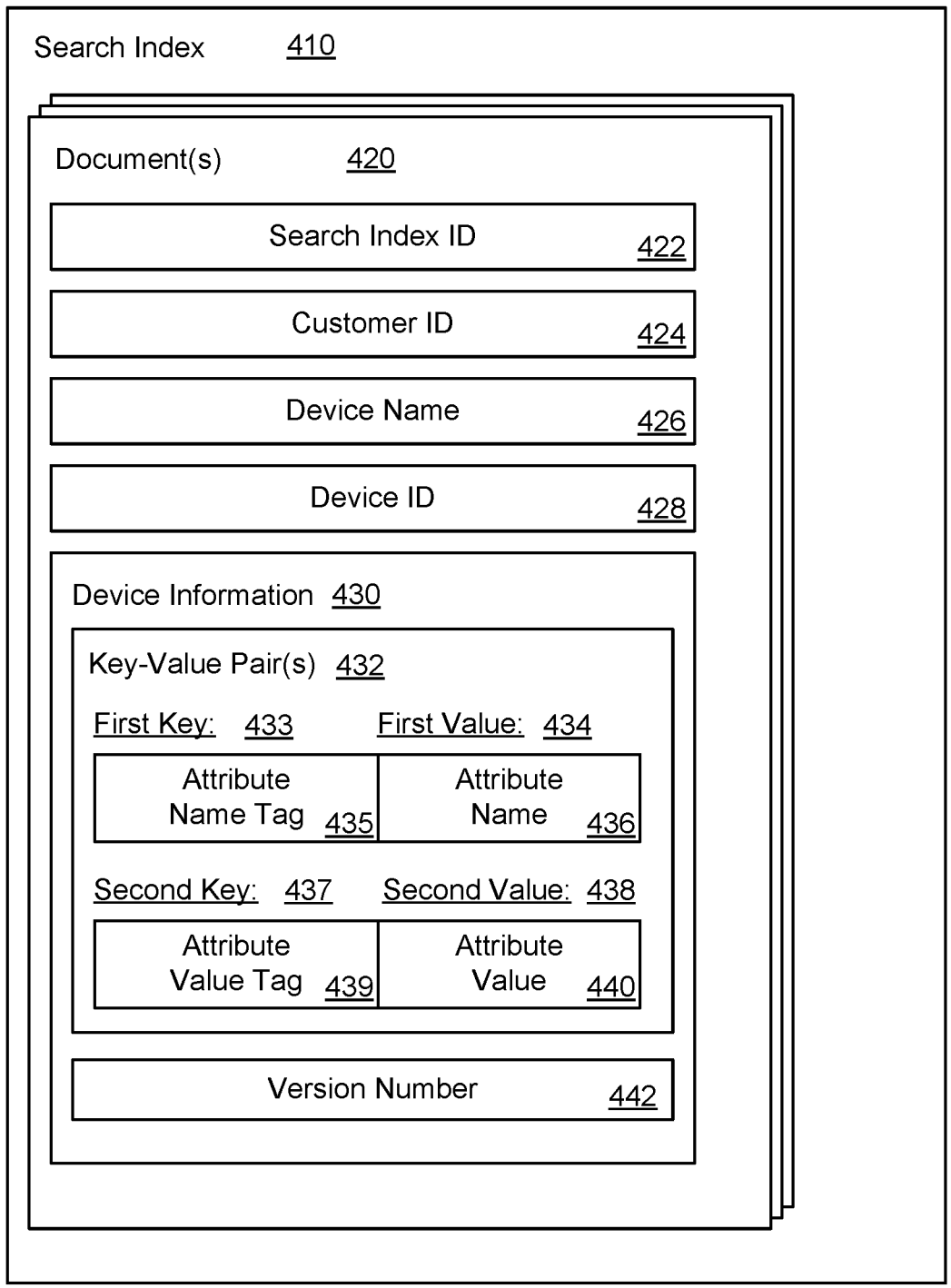
FIG. 4 illustrates a search index according to an example of the present technology.

FIG. 4 illustrates exemplary data that may be contained in a search index 410. The search index 410 may be a collection of documents 420. A document 420 may include a search index identifier (ID) 422 that identifies a particular search index associated with the document 420, a customer ID 424, a device name 426, a device ID 428 and device information 430 (e.g., device registry information and/or device state information). The device information 430 may include a plurality of key-value pairs 432 that are associated with the device ID 428 and the customer ID 424. The key-value pairs 432 may include a first key 433 and a first value 434. The first key 433 may define an attribute name tag 435 and the first value 434 may define a corresponding attribute name 436. The key-value pair 432 may further include a second key 437 and a second value 438. The second key 437 may define an attribute value tag 439 and the second value 438 may define a corresponding attribute value 440. In addition, the device information 430 may include a version number 442 associated with the device information 430. The version number 442 may be incremented when an updated version of the device information 430 is included in the document 420.

In one example, an indexing and querying service (as in FIG. 3) may identify updated device information to be included in the document 420. For example, the updated device information may include updated key-value pairs that reflect updated device attributes associated with the customer ID 424. In this example, the indexing and querying service may determine whether a version number of the updated device information is greater than or more recent than the version number 442 associated with the device information 430 that is currently included in the document 420. When the version number of the updated device information is greater than the version number 442 associated with the device information 430, the indexing and querying service may replace the device information 430 in the document 420 with the updated device information. On the other hand, when the version number of the updated device information is less than or equal to the version number 442 associated with the device information 430, then the indexing and querying service may determine that the device information 430 that is currently included in the document 420 is already up-to-date and is not updated. Based on the version number associated with the device information 430, the indexing and querying service may prevent out-of-order updates of the device information 430.

FIG. 5 illustrates an example of a specific document in a search index. The document may be a JavaScript Object Notation (JSON) document. The document may include an account field (e.g., account) and an associated value (e.g., AccountID), a customer index field (e.g., customerIndex) and an associated value (e.g., CustomerIndexID), a thing/device name field (e.g., thingName) and an associated value (e.g., ThingName), and a thing/device ID field (e.g., thingId) and an associated value (e.g., ThingID). In one example, the document may include a registry field (e.g., registry). The registry field may include a thing/device type field (e.g., thingType) and an associated value (e.g., ThingType), and a thing/device group name field (e.g., thingGroupNames) and an associated set of values (e.g., Group 1, Group2 and so on).

In one example, the registry field in the document may include an attribute field for describing a plurality of registry attributes. As an example, as indicated in the attribute field, a first registry attribute may include an attribute name tag (e.g., attributeName) and a corresponding attribute name (e.g., Name1), as well as an attribute value tag (e.g., stringValue) and a corresponding attribute value (e.g., Value1). In other words, the first registry attribute may be defined using key-value pairs, where a first key 510 corresponds to the attribute name tag (e.g., attributeName) and a first value 512 corresponds to the attribute name (e.g., Name1), and a second key 520 corresponds to the attribute value tag (e.g., stringValue) and a second value 522 corresponds to the attribute value (e.g., Value1). In this example, the attribute value may be a string value.

As another example, a second registry attribute may be defined using key-value pairs, where a first key corresponds to an attribute name tag (e.g., attributeName) and a first value corresponds to a corresponding attribute name (e.g., Name2), a second key corresponds to an attribute value tag (e.g., stringValue) and a second value corresponds to a corresponding string attribute value (e.g., Value2AsString), and a third key corresponds to an attribute value tag (e.g., numericValue) and a third value corresponds to a corresponding numeric attribute value (e.g., Value2AsNumber). In other words, the second registry attribute may also be defined using key-value pairs, similar to the first registry attribute. In this example, the attribute values may have both string values and numeric values.

In one example, the registry field in the document may include an All Attribute Names field (e.g., allAttributeNames) and an associated set of values (e.g., Name1, Name2, and so on). The document may include an All Values field (e.g., allValues) and an associated set of values (e.g., Value1, Value2AsString, Value2AsNumber, and so on) to enable searching without a field name. In addition, the document may include a version field (e.g., version) and an associated value (e.g., RegistryDDBRecordVersion) that indicates a version number of the registry field.

In one example, the document may include a device state field (e.g., a shadow state) for describing a plurality of device state attributes as reported to the service provider environment. For example, the device state field may include a desired attribute field (e.g., desired) to indicate a desired state of the thing/device name. The device state field may include a reported attribute field (e.g., reported) to indicate a reported state of the thing/device name. The device state field may include a delta attribute field (e.g., delta) to indicate a difference between the desired state and the reported state of the thing/device name. The device state field may include a metadata attribute field (e.g., metadata) to indicate metadata for the thing/device name. Each of the attribute fields included in the device state field may be key-value pairs, similar to the attribute fields in the registry field. In addition, the document may include a version field (e.g., version) and an associated value (e.g., ShadowDD-BRecordVersion) that indicates a version number of the device state fields.

In one example, the document may be created in accordance with a fixed schema. For example, the fixed schema may define the document to include the account field, the customer index field, the thing/device name field, and the thing/device ID field. The fixed schema may define the document to include the registry field, as well as the thing/device type field, the thing/device group name field, the All Attribute Names field, the All Values field, and the version field associated with the registry field. The registry field may include the attribute field and the attribute tags (e.g., the attribute name tag of attributeName and the attribute value tag stringValue or numericValue), in accordance with the fixed schema. Further, the fixed schema may define the document to include the device state field (similar to the registry field). On the other hand, the fields and values in the document (e.g., AccountID, CustomerIndexID, ThingName, ThingID, ThingType, Name1, Value1, Name2, Value2AsString, Value2AsNumber, and so on) may be customer and/or device dependent.

In one example, the registry field may include a version number and the device state field may include a version number that is separate from that of the registry field. Since the registry field and the device state field include separate version numbers, the registry field may be updated separately from the device state field.

Figure 6:
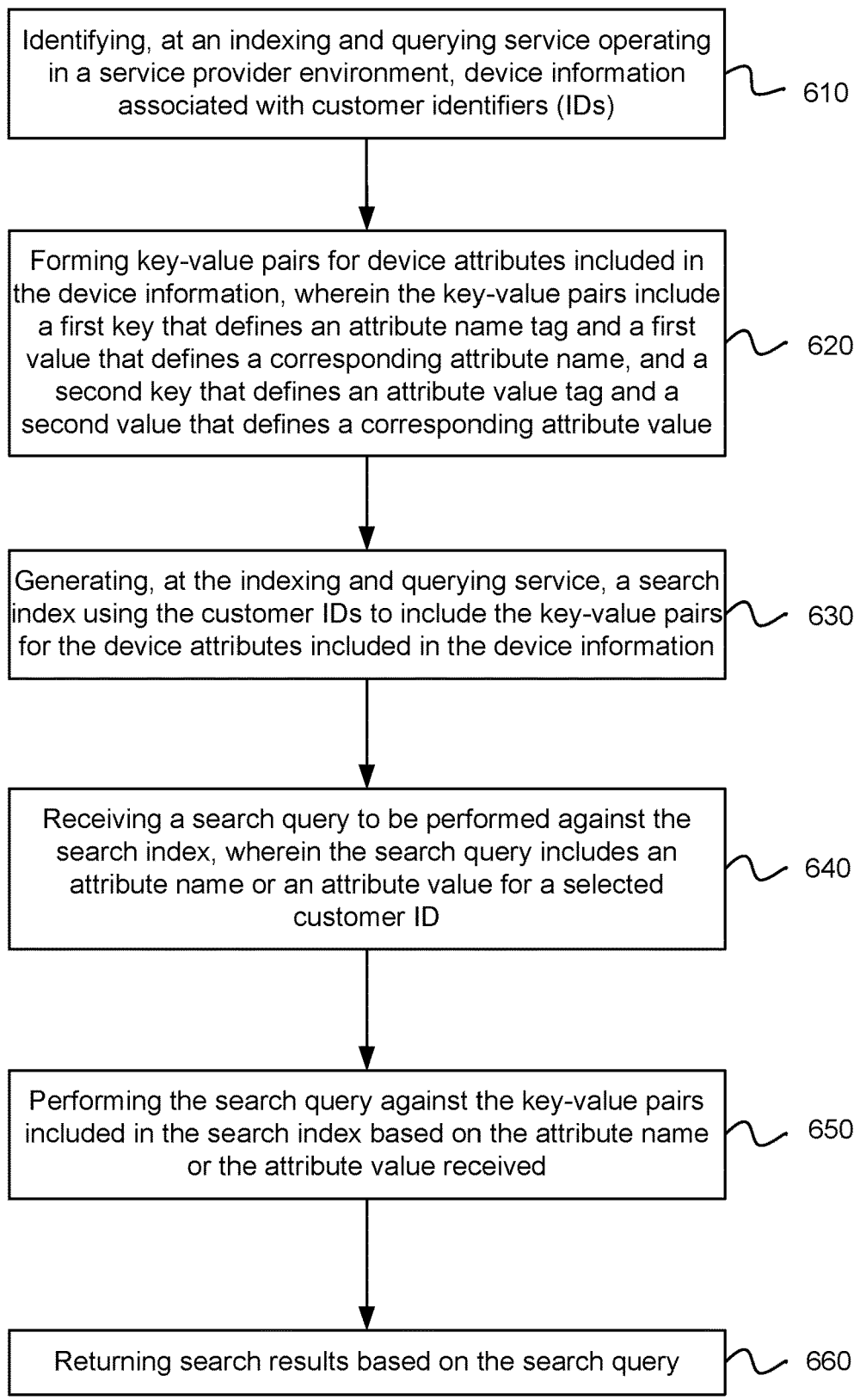
FIG. 6 is a flowchart of an example method for generating a search index and performing search queries against the search index.

FIG. 6 illustrates an example of a method for generating a search index and performing search queries against the search index. Device information associated with customer identifiers (IDs) may be identified at an indexing and querying service operating in a service provider environment, as in block 610. The device information may be associated with a plurality of devices (e.g., IoT devices). The device information may include device registry information with a definition of a device. In addition, the device information may include device state information that describes a current state of the device.

Key-value pairs may be formed for device attributes included in the device information, as in block 620. The key-value pairs may include a first key that defines an attribute name tag and a first value that defines a corresponding attribute name, as well as a second key that defines an attribute value tag and a second value that defines a corresponding attribute value. The corresponding attribute value may be a string attribute value or a numeric attribute value.

A search index may be generated at the indexing and querying service using the customer IDs, as in block 630. The search index may include the key-value pairs for the device attributes included in the device information. In one example, the search index may be associated with a single customer ID, or alternatively, the search index may be associated with multiple customer IDs.

A search query to be performed against the search index may be received at the indexing and querying service, as in block 640. The search query may be received from a customer computing device that is in communication with the indexing and querying service. The search query may include an attribute name and/or an attribute value for a selected customer ID. In addition, the search query may be a string search query and/or a numeric search query.

The search query may be performed against the key-value pairs included in the search index based on the attribute name and/or the attribute value received for the selected customer ID, as in block 650. In other words, the attribute name and/or the attribute value included in the search query may be compared with the attribute names and attribute values included in the key-value pairs.

Search results based on the search query may be returned, as in block 660. For example, the search results may include a listing of attribute names and/or attribute values from the search index that match or correspond to the attribute name and/or the attribute value included in the search query. As another example, a listing of documents that include attribute names and/or attribute values that match to the attribute name and/or the attribute value included in the search query may be returned. Alternatively, the search results may indicate no match between the attribute names and/or attribute values in the search index and the attribute name and/or the attribute value included in the search query.

Figure 7:
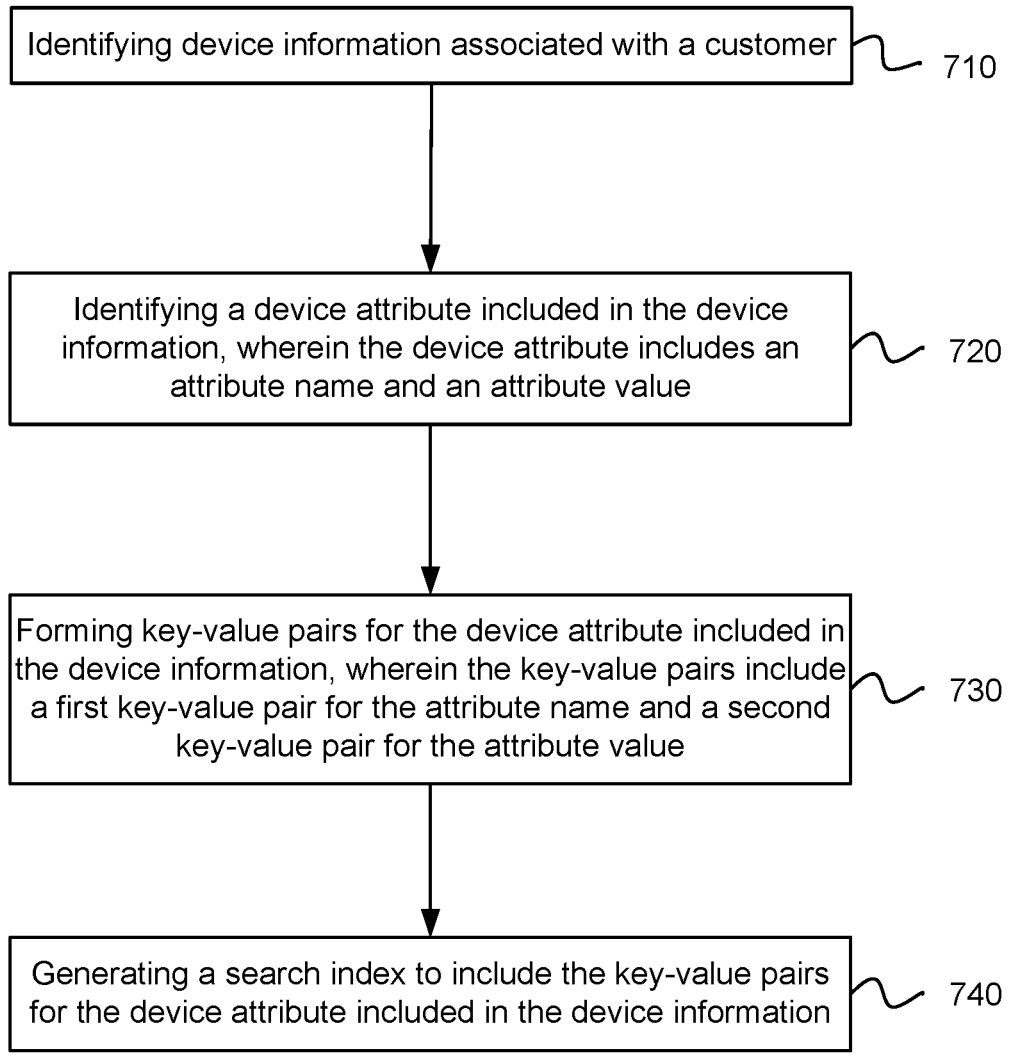
FIG. 7 is a flowchart of an example method for generating a search index.

FIG. 7 illustrates an example of a method for generating a search index. The search index may be generated based on a flag enabled in a customer account associated with a customer. Device information associated with the customer may be identified, as in block 710. The device information may include device registry information and/or device state information.

A device attribute included in the device information may be identified, as in block 720. The device attribute may include an attribute name (e.g., a field name) and an attribute value. The device attribute may be related to the device registry information and/or the device state information.

Key-value pairs may be formed for device attribute included in the device information, as in block 730. The key-value pairs may include a first key-value pair for the attribute name and a second key-value pair for the attribute value. More specifically, the first key-value pair for the attribute name may include a first key that defines an attribute name tag and a first value that defines a corresponding attribute name, and the second key-value pair for the attribute value may include a second key that defines an attribute value tag and a second value that defines a corresponding attribute value.

A search index may be generated to include the key-value pairs for the device attributes included in the device information, as in block 740. The search index may be generated as a collection of documents. As an example, a document may include a search index ID, the customer ID, a device name and a device ID. In addition, the document may include device information that corresponds to the device ID, where the device information may include the key-value pairs for the device attributes and a version number associated with the device information.

Figure 8:
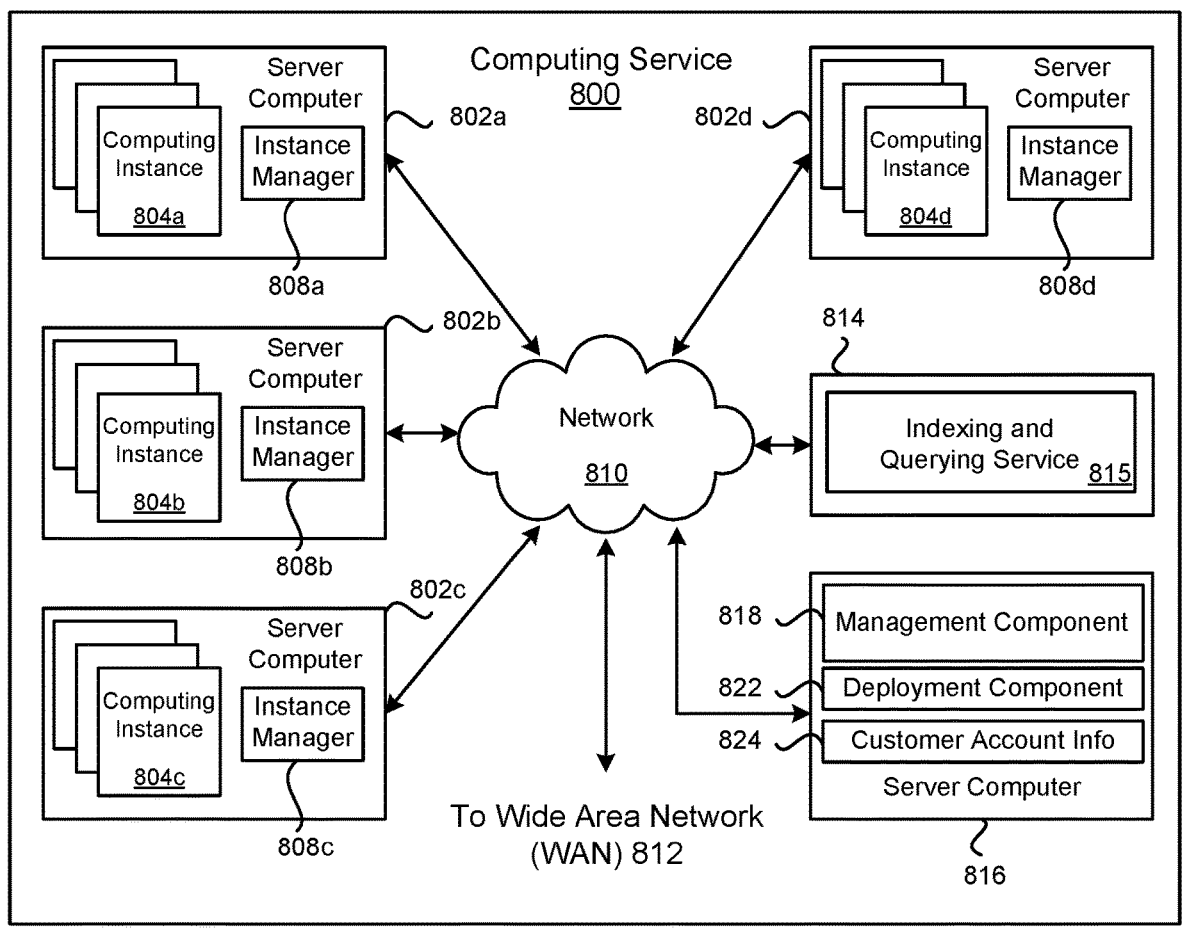
FIG. 8 is a block diagram of a service provider environment according to an example of the present technology.

FIG. 8 is a block diagram illustrating an example computing service 800 that may be used to execute and manage a number of computing instances 804a-d upon which the present technology may execute. In particular, the computing service 800 depicted illustrates one environment in which the technology described herein may be used. The computing service 800 may be one type of environment that includes various virtualized service resources that may be used, for instance, to host computing instances 804a-d.

The computing service 800 may be capable of delivery of computing, storage and networking capacity as a software service to a community of end recipients. In one example, the computing service 800 may be established for an organization by or on behalf of the organization. That is, the computing service 800 may offer a "private cloud environment." In another example, the computing service 800 may support a multi-tenant environment, wherein a plurality of customers may operate independently (i.e., a public cloud environment). Generally speaking, the computing service 800 may provide the following models: Infrastructure as a Service ("IaaS"), Platform as a Service ("PaaS"), and/or Software as a Service ("SaaS"). Other models may be provided. For the IaaS model, the computing service 800 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 800. End customers may access the computing service 800 using networked client devices, such as desktop computers, laptops, tablets, smartphones, etc. running web browsers or other lightweight client applications, for example. Those familiar with the art will recognize that the computing service 800 may be described as a "cloud" environment.

The particularly illustrated computing service 800 may include a plurality of server computers 802*a-d*. The server computers 802*a-d* may also be known as physical hosts. While four server computers are shown, any number may be used, and large data centers may include thousands of server computers. The computing service 800 may provide computing resources for executing computing instances 804*a-d*. Computing instances 804*a-d* may, for example, be virtual machines. A virtual machine may be an instance of a software implementation of a machine (i.e. a computer) that executes applications like a physical machine. In the example of a virtual machine, each of the server computers 802*a-d* may be configured to execute an instance manager 808*a-d* capable of executing the instances. The instance manager 808*a-d* may be a hypervisor, virtual machine manager (VMM), or another type of program configured to enable the execution of multiple computing instances 804*a-d* on a single server. Additionally, each of the computing instances 804*a-d* may be configured to execute one or more applications.

A server 814 may be reserved to execute software components for implementing the present technology or managing the operation of the computing service 800 and the computing instances 804*a-d*. For example, the server 814 may execute an indexing and querying service 815 operable to identify device information associated with customer identifiers (IDs). The indexing and querying service 815 may form key-value pairs for device attributes included in the device information. The key-value pairs may include a first key that defines an attribute name tag and a first value that defines a corresponding attribute name, and a second key that defines an attribute value tag and a second value that defines a corresponding attribute value. The indexing and querying service 815 may generate a search index for the customer IDs to include the key-value pairs for the device attributes included in the device information. The indexing and querying service 815 may receive a search query to be performed against the search index. The search query may include an attribute name or an attribute value for a selected customer ID. The indexing and querying service 815 may perform the search query against the key-value pairs included in the search index based on the attribute name or the attribute value received for the selected customer ID. The indexing and querying service 815 may return search results based on the search query.

A server computer 816 may execute a management component 818. A customer may access the management component 818 to configure various aspects of the operation of the computing instances 804*a-d* purchased by a customer. For example, the customer may setup computing instances 804*a-d* and make changes to the configuration of the computing instances 804*a-d*.

A deployment component 822 may be used to assist customers in the deployment of computing instances 804*a-d*. The deployment component 822 may have access to account information associated with the computing instances 804*a-d*, such as the name of an owner of the account, credit card information, country of the owner, etc. The deployment component 822 may receive a configuration from a customer that includes data describing how computing instances 804*a-d* may be configured. For example, the configuration may include an operating system, provide one or more applications to be installed in computing instances 804*a-d*, provide scripts and/or other types of code to be executed for configuring computing instances 804*a-d*, provide cache logic specifying how an application cache is to be prepared, and other types of information. The deployment component 822 may utilize the customer-provided configuration and cache logic to configure, prime, and launch computing instances 804*a-d*. The configuration, cache logic, and other information may be specified by a customer accessing the management component 818 or by providing this information directly to the deployment component 822.

Customer account information 824 may include any desired information associated with a customer of the multi-tenant environment. For example, the customer account information may include a unique identifier for a customer, a customer address, billing information, licensing information, customization parameters for launching instances, scheduling information, etc. As described above, the customer account information 824 may also include security information used in encryption of asynchronous responses to API requests. By "asynchronous" it is meant that the API response may be made at any time after the initial request and with a different network connection.

A network 810 may be utilized to interconnect the computing service 800 and the server computers 802*a-d*, 816. The network 810 may be a local area network (LAN) and may be connected to a Wide Area Network (WAN) 812 or the Internet, so that end customers may access the computing service 800. In addition, the network 810 may include a virtual network overlaid on the physical network to provide communications between the servers 802*a-d*. The network topology illustrated in FIG. 8 has been simplified, as many more networks and networking devices may be utilized to interconnect the various computing systems disclosed herein.

Figure 9:
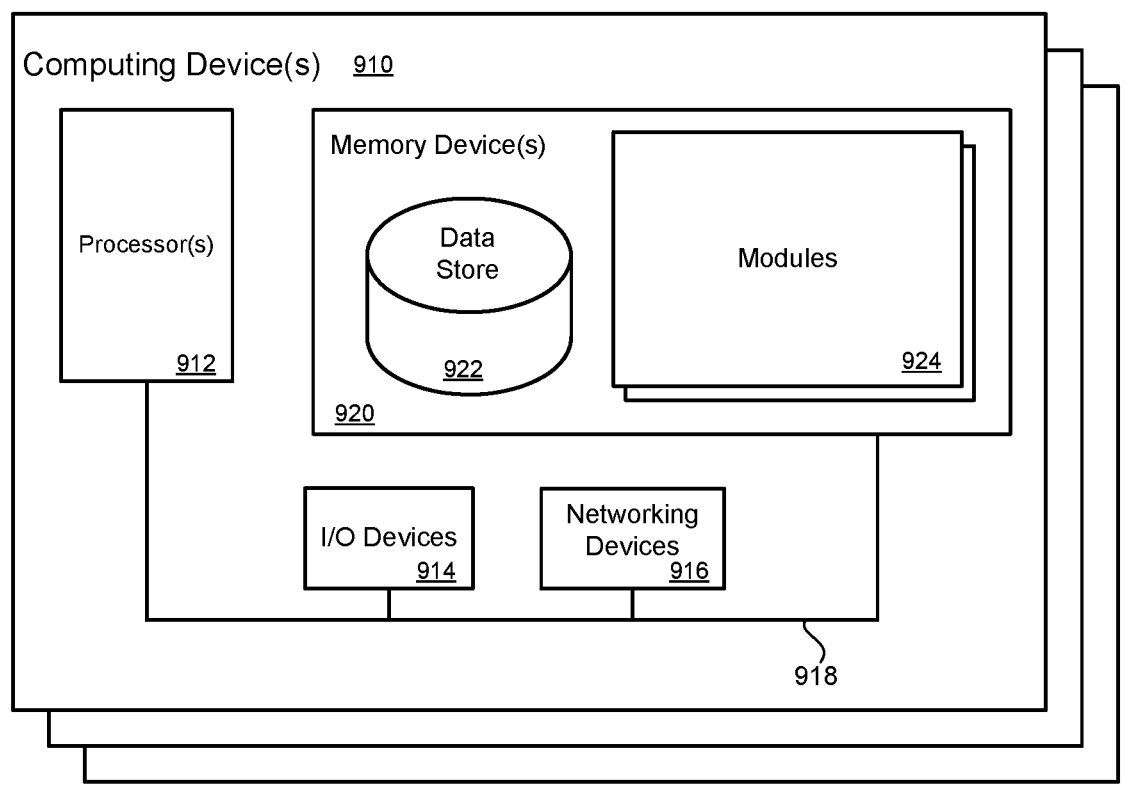
FIG. 9 is a block diagram that provides an example illustration of a computing device that may be employed in the present technology.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules 924 that are executable by the processor(s) 912 and data for the modules 924. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions being executed by one or more processors, comprising:
    identifying, at an indexing and querying service operating in a service provider environment, device information associated with customer identifiers (IDs);
    forming key-value pairs for device attributes included in the device information, wherein the key-value pairs include a first key that defines an attribute name tag and a first value that defines a corresponding attribute name, and a second key that defines an attribute value tag and a second value that defines a corresponding attribute value;
    generating, at the indexing and querying service, a search index using the customer IDs to include the key-value pairs for the device attributes included in the device information;
    receiving a search query to be performed against the search index, wherein the search query includes an attribute name or an attribute value for a selected customer ID;
    performing the search query against the key-value pairs included in the search index based on the attribute name or the attribute value received; and
    returning search results based on the search query.

2. The non-transitory machine readable storage medium of claim 1, wherein the device information includes one or more of:
    device registry information that includes a definition of a device;
    device state information that describes a current state of the device;
    device connection information;
    device geolocation information; or
    device behavior data.

3. The non-transitory machine readable storage medium of claim 1, further comprising:
    generating an alternative search index for a selected customer ID, wherein customer queries are served by the search index during generation of the alternative search index; and
    switching to the alternative search index for the selected customer ID after generation of the alternative search index is completed, wherein customer queries received after generation of the alternative search index are served by the alternative search index.

4. The non-transitory machine readable storage medium of claim 1, further comprising:
    storing the search index for the customer IDs on a cluster of computing resources in the service provider environment; and
    updating the search index to reflect updated device information for a selected customer ID.

5. A method, the method comprising:
    identifying device information associated with a customer;
    identifying a device attribute included in the device information, wherein the device attribute includes an attribute name and an attribute value;
    forming key-value pairs for the device attribute included in the device information, wherein the key-value pairs include a first key-value pair for the attribute name and a second key-value pair for the attribute value;
    generating a search index to include the key-value pairs for the device attribute included in the device information; and
    requesting a search query be performed against the search index.

6. The method of claim 5, further comprising:
    receiving the search query to be performed against the search index, wherein the search query includes an attribute name or an attribute value for a selected customer ID and a selected search index ID;
    performing the search query against the key-value pairs included in the search index based on the attribute name or the attribute value received for the selected customer ID and the selected search index ID; and
    returning search results based on the search query, wherein the search query is one of a string search query or a numeric search query.

7. The method of claim 5, wherein:
    the first key-value pair for the attribute name includes a first key that defines an attribute name tag and a first value that defines a corresponding attribute name; and
    the second key-value pair for the attribute value includes a second key that defines an attribute value tag and a second value that defines a corresponding attribute value.

8. The method of claim 5, wherein the device information includes one or more of:
    device registry information that includes a definition of a device;
    device state information that describes a current state of the device;
    device connection information;
    device geolocation information; or
    device behavior data.

9. The method of claim 5, further comprising generating the search index to include device information for a plurality of customer IDs.

10. The method of claim 5, further comprising:
    generating the search index for a customer ID to replace a previously generated search index for the customer ID, wherein customer queries are served by the previously generated search index during generation of the search index; and
    deleting the previously generated search index after generation of the search index is completed, wherein customer queries received after generation of the search index are served by the search index and not by the previously generated search index.

11. The method of claim 5, further comprising:
receiving a search index update request for an additional customer;
identifying additional device information and additional key-value pairs associated with the additional customer; and
adding the additional device information and the additional key-value pairs to the search index.

12. The method of claim 5, further comprising generating the search index to include a plurality of documents, wherein a document in the plurality of documents includes:
a search index ID;
a customer ID;
a device name;
a device ID; and
the device information that corresponds to the device ID, wherein the device information includes:
the key-value pairs for the device attribute; and
a version number associated with the device information.

13. The method of claim 12, further comprising generating the document in accordance with a defined schema that enables the device attribute included in the device information to be reorganized as the key-value pairs.

14. The method of claim 12, further comprising:
identifying updated device information to be included in the document;
determining that a version number of the updated device information is greater than the version number associated with the device information that is currently included in the document; and
replacing the device information in the document with the updated device information.

15. The method of claim 12, further comprising generating the search index to include the device information and the key-value pairs in response to a flag enabled in a customer account associated with the customer.

16. A system, comprising:
at least one processor;
at least one memory device including a data store to store a plurality of data and instructions that, when executed, cause the system to:
identify, at an indexing and querying service, device information associated with customers that is stored in a service provider environment;
identify device attributes included in the device information;
convert the device attributes into index entries with a first common key for attribute names and a second common key for attribute values;
generate, at the indexing and querying service, a search index for the customers including the attribute names with the first common key and the attribute values with the second common key;
perform a search query against the attribute names and the attribute values included in the search index based on an attribute name or an attribute value received for the search query; and
return search results based on the search query in a format defined by the device information stored in the service provider environment.

17. The system of claim 16, wherein the plurality of data and instructions, when executed, cause the system:
store the search index on a cluster of computing resources in the service provider environment; and
update the search index to reflect updated device information for customers.

18. The system of claim 16, wherein the plurality of data and instructions, when executed, cause the system:
generate an alternative search index for a selected customer ID;
generate the alternative search index for the selected customer ID, wherein customer queries are served by the search index during generation of the alternative search index; and
switch to the alternative search index for the selected customer ID after generation of the alternative search index is completed, wherein customer queries received after generation of the alternative search index are served by the alternative search index.

19. The system of claim 16, wherein the device information includes one or more of:
device registry information that includes a definition of a device;
device state information that describes a current state of the device;
device connection information;
device geolocation information; or
device behavior data.

20. The system of claim 16, wherein the plurality of data and instructions, when executed, cause the system generate the search index to include a plurality of documents, wherein a document in the plurality of documents includes:
a search index ID;
a customer ID;
a device name;
a device ID; and
the device information that corresponds to the device ID, wherein the device information includes:
key-value pairs for the device attributes; and
a version number associated with the device information.

* * * * *